United States Patent [19]

Mulder

[11] 3,822,387

[45] July 2, 1974

[54] CIRCUIT FOR RE-GENERATING A CURRENT

[75] Inventor: Cornelis Mulder, Emmasingel, Eindhoven, Netherlands

[73] Assignee: U.S. Philips Corporation, New York, N.Y.

[22] Filed: June 2, 1972

[21] Appl. No.: 258,952

[30] Foreign Application Priority Data

June 16, 1971 Netherlands ...................... 7108233

[52] U.S. Cl. .......... 307/299 B, 250/211 J, 307/303, 307/311, 317/235 Z, 317/235 E, 317/235 N

[51] Int. Cl. ............................................ H01l 19/00

[58] Field of Search ...... 307/311, 299 B; 250/211 J; 328/2

[56] References Cited

UNITED STATES PATENTS

| | | | |
|---|---|---|---|
| 3,424,908 | 1/1969 | Sitter | 307/311 |
| 3,430,106 | 2/1969 | McDowell | 307/311 |
| 3,487,323 | 12/1969 | Schaefer | 307/299 B |
| 3,553,500 | 1/1971 | Easter | 328/2 |
| 3,648,154 | 3/1972 | Frederiksen et al. | 307/299 B |
| 3,688,220 | 8/1972 | Gay | 307/299 B |
| 3,700,921 | 10/1972 | Gay | 307/299 B |

*Primary Examiner*—Rudolph V. Rolinec
*Assistant Examiner*—William D. Larkins
*Attorney, Agent, or Firm*—Frank R. Trifari

[57] ABSTRACT

Integrated circuit for measuring the short-circuit current of a photodiode, which circuit uses the combination of an npn current mirror and a multi-collector lateral pnp transistor the base of which is controlled via a current-amplifying npn transistor.

8 Claims, 4 Drawing Figures

CIRCUIT FOR RE-GENERATING A CURRENT

The invention relates to an integrated circuit for re-generating, over a large current range, an input current which is caused to become operative as a difference current between the emitter of a first transistor and an electrode of a diode the other electrode of which is connected to the base of this transistor, the currents supplied to the diode and to the collector of the first transistor being provided by a transistor circuit which comprises a second transistor of the opposite conductivity type the base of which is controlled in accordance with the voltage produced at the collector of the first transistor.

Such a circuit may be used, for example, in photographic cameras for automatic setting of the exposure time. The output current obtained is supplied to an integrating network, the shutter being closed when a prescribed voltage is reached which is also determined by the sensitivity of the film and by the stop used. A similar use is found in automatic printing devices for printing film negatives.

As a measuring element for converting the incident light into an electric current a photosensitive semiconductor diode is increasingly being used. Such a diode may simply be connected to, or included in, an integrated circuit, its small size and low sensitivity to variations in temperature and supply voltage being of importance in this respect. The invention utilizes the recognition of the fact that the measurement will be appreciably more accurate when the short-circuit current (i.e. the current measured at an external voltage = zero) than when the open-circuit voltage (i.e. the voltage measured at an external current = zero) of the photodiode is measured; in the latter method of measuring, a leakage current of the order of 100 pA per volt limits the maximum sensitivity to be attained.

In a known circuit of the aforementioned type, which was also designed to re-generate the short-circuit current of a current source, two current mirrors are used one of which includes a pnp transistor while the other includes npn transistors. This circuit is intended to cover a current range from 20 $\mu$A to 20 mA. It is an object of the invention to provide an improvement such that an integrated circuit is obtained which is suitable for input currents in a range from less than 10 pA to more than 10 $\mu$A, that is a range of at least six powers of ten. The invention is characterized in that the first transistor is a vertical transistor (preferably a npn transistor), in that the second transistor is a lateral transistor (preferably a pnp transistor) having a plurality of collectors a first one of which supplies the current to the diode and a second of which supplies the current to the collector of the first transistor, in that the base current of the second transistor is produced by a current-amplifying transistor circuit which comprises at least one third, vertical transistor, and in that the output current is derived from a third collector of the lateral transistor or from the collector of a fourth, vertical transistor the base of which is connected to that of the first transistor.

In the circuit according to the invention the diode and the first transistor also form a current mirror, however, the transistor circuit which includes the second transistor deliberately is not designed as a current mirror, for, although when multi-collector lateral transistors are used it can be ensured that the currents delivered by these collectors are substantially equal to one another or are in a fixed ratio to one another which is determined by the ratio between the collecting areas, in the case of current operation of the order of several $p$A the required base current is such as to give rise to a new error source in the output current produced; this error source is suppressed by the use of the steps according to the invention.

Embodiments of the invention will now be described, by way of example, with reference to the accompanying diagrammatic drawings, in which.

Figure 1:
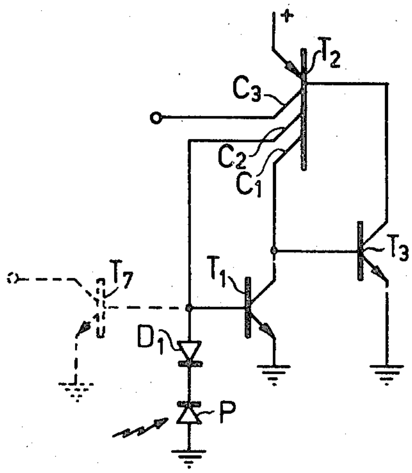
FIG. 1 is a circuit diagram of a simplified embodiment of the invention.

Referring now to FIG. 1, the base emitter path of a first transistor $T_1$ is shunted by the series combination of a diode $D_1$ and a current source in the form of a photodiode P. The currents to the collector of the transistor $T_1$ and to the diode $D_1$ are supplied by collectors $c_1$ and $c_2$ respectively of a second transistor $T_2$ of the opposite conductivity type. The collector of the transistor $T_1$ is also connected to the base of a transistor $T_3$ the conductivity type of which is the same as that of $T_1$ and the collector of which is connected to the base of $T_2$. The output current is derived from a further collector $c_3$ of $T_2$.

The circuit is made in integrated-circuit form, however, in general the photodiode P preferably is not included in this circuit to permit greater freedom in the choice of the photosensitivity and/or color sensitivity of such a diode.

The transistors $T_1$ and $T_3$ are vertical (transversal) transistors, i.e. in the semiconductor element of the integrated circuit the various active transistor regions, when viewed from above, lie one on top of the other. The transistor $T_2$ here is a lateral transistor, i.e. the active transistor regions, when viewed from above, lie side by side. The diode $D_1$ also is a vertical transistor the base and collector of which are electrically interconnected. Preferably $T_1$ and $T_3$ are vertical npn transistors and $T_2$ is a lateral pnp transistor.

It is a known property of multi-collector transistors that the currents which flow to the various collectors $c_1$, $c_2$ and $c_3$ are solely determined, within close tolerances, by the sizes of the collecting areas of these collectors. With the very low current biases mentioned hereinbefore special attention must be paid to a symmetrical arrangement of the collectors with respect to the emitter, but this may readily be achieved in practice. It is also known that in vertical transistors having parallel-connected emitter base paths the ratios between the emitter currents are substantially determined only by the sizes of the emitting areas. These known properties are utilized in the present invention.

Assuming the areas of the collectors $c_1$ and $c_2$ to be equal, these collectors will deliver equal currents. Neglecting the base currents of the transistors $T_1$ and $T_3$ with respect to their collector currents, which is permissible with vertical transistors, the diode $D_1$ and the emitter base junction of the transistor $T_1$ pass equal currents. When the emitter areas of $D_1$ and $T_1$ are equal the voltages across $D_1$ and across the emitter base junction of $T_1$ will also be equal, in other words, the voltage across P is zero.

Consequently the photo-diode P is operated at its short-circuit current I so that errors due to diode leakage are avoided. The currents delivered by $c_1$ and $c_2$ will automatically adjust themselves so as to become equal to I, for if the current delivered by $c_2$ were smaller than the current I impressed by P by an amount $\Delta$ I, this deficiency $\Delta$ I will be amplified in $T_1$ and $T_3$ and will reach the base of $T_2$ with a phase such that $\Delta$ I is greatly suppressed.

The described combination of steps provides a circuit which is suitable for far smaller currents than is the known circuit. In the known circuit the transistor $T_2$ is replaced by a current mirror and the output current is supplied by a further transistor connected in series with the diode of the current mirrror, the conductivity type of this further transistor being equal to that of the transistors of the current mirror. The transistors are assumed to be ideal transistors; hence those of the one conductivity type form part of another integrated circuit than those of the other conductivity type. However, when according to the concept of the invention all the transistors are accommodated in one common integrated circuit, the lateral transistors used will cause a deviation from the ideal such that the output current produced differs widely from the input current offered.

In the case of comparatively large bias currents, the circuit described above will tend toward instability, for a deficiency $\Delta$ I of offered current is amplified in each of the transistors $T_1$ and $T_3$ by a factor of $\beta_n$ and then multiplied in the transistor $T_2$ by a factor of $\beta_p$, where $\beta$ is the collector base current gain factor. At a very low current setting, for example I = 20 *p*A, $\beta_n$ may be 20 and $\beta_p$ may be 0.5, so that a (negative) loop amplification $\beta n^2 \cdot \beta_p = 200$ is to be expected. At a current setting which is higher by some powers of ten, for example I = 20 $\mu$A, $\beta_n$ may rise to 100 and $\beta_p$ may rise to 20, so that the loop amplification will be 200,000. It is true that the provision of capacitors at suitable points enables the circuit to be maintained stable, however, this step will also cause the response of the circuit to rapid variations of the current I offered by P to become slower.

Figure 2:
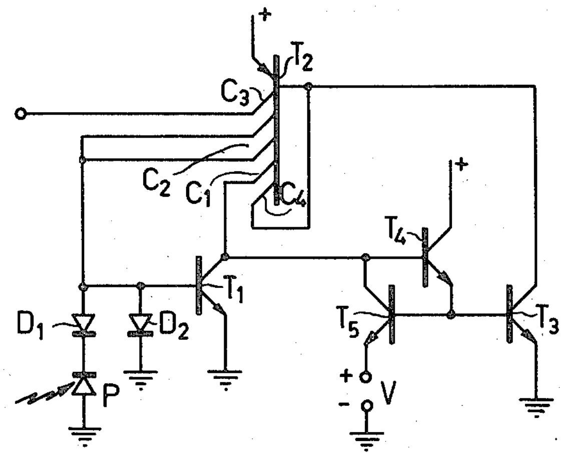
FIG. 2 is a more elaborate circuit diagram.

In the circuit shown in FIG. 2 this disadvantage is obviated in that the current gain of $T_1$ is artificially reduced to unity and that of $T_2$ is controlled so that it substantially cannot exceed a fixed value. Thus the loop amplification is determined only by the $\beta_n$ of $T_3$, so that the likelihood of instability is largely suppressed. By means of a small artifice this $\beta_n$ may readily be stabilised at a value which is independent of the spread in the actual $\beta$.

The circuit shown in FIG. 2 includes an additional diode $D_2$ while the collector $c_2$ has a larger collecting area then has the collector $c_1$. In practice the diode $D_2$ also is a vertical transistor the collector of which is connected to the base. When the emitter area of $D_2$ also is equal to that of $T_1$ the area of $c_2$ is made twice that of $c_1$, which is shown symbolically by the double line of $c_2$. When $c_1$ supplies a current I − $\Delta$ I, $c_2$ will supply a current 2I − 2$\Delta$ I. $D_1$ can only pass a current I. Hence the remainder of the current, I − 2 $\Delta$ I, is supplied to $D_2$ and to the base of $T_1$ which behave as a current mirror. Thus the collector of $T_1$ passes a current I − 2 $\Delta$ I; $c_1$ offers a current I − $\Delta$ I and consequently the current difference $\Delta$ I is supplied to the further current amplifier which includes the transistor $T_3$.

This current amplifier further comprises vertical transistors $T_4$ and $T_5$ of a conductivity type equal to that of $T_1$. The collector of $T_1$ is connected to the base of $T_4$ and to the collector of $T_5$. The emitter of $T_4$ is connected to the bases of $T_5$ and $T_3$; its collector is connected to the supply terminal + or, if required, to the collector of $T_3$. A small reverse bias voltage V, for example of the order of 100 mV, is set up in the emitter of $T_5$. This circuit arrangement causes the current $\Delta$ I supplied to $T_4 - T_5 - T_3$ to be amplified by a fixed factor of N which is determined by the voltage V, so that a current N $\Delta$ I flows in the collector of $T_3$.

The transistor $T_2$ has an additional lateral collector $c_4$ which is connected to the base of $T_2$. The collecting area of $c_4$ is made equal, for example, to that of $c_1$, so that $c_4$ also passes a current I − $\Delta$ I. If the area of $c_3$ also is equal to that of $c_1$, the base current of $c_2$ will be $$5\ (I - \Delta\ I)/\beta_p$$

so that $$N\ \Delta\ I = 5\ (I - \Delta\ I)/\beta_p + (I - \Delta\ I)$$

(The factor of 5 corresponds to the number of collectors used, for $\beta_p$ is defined as the ratio between the combined currents flowing to $c_1$ to $c_4$ and the base current of $T_2$). If now $\beta_p$ is less than 1 (low current setting), the first term of the right side will play the chief part; if, however, $\beta_p$ increases to exceed 10 (higher current setting), the first term may be progressively neglected with respect to the second term, which means that the effective current gain of $T_2$ is limited.

Figure 3:
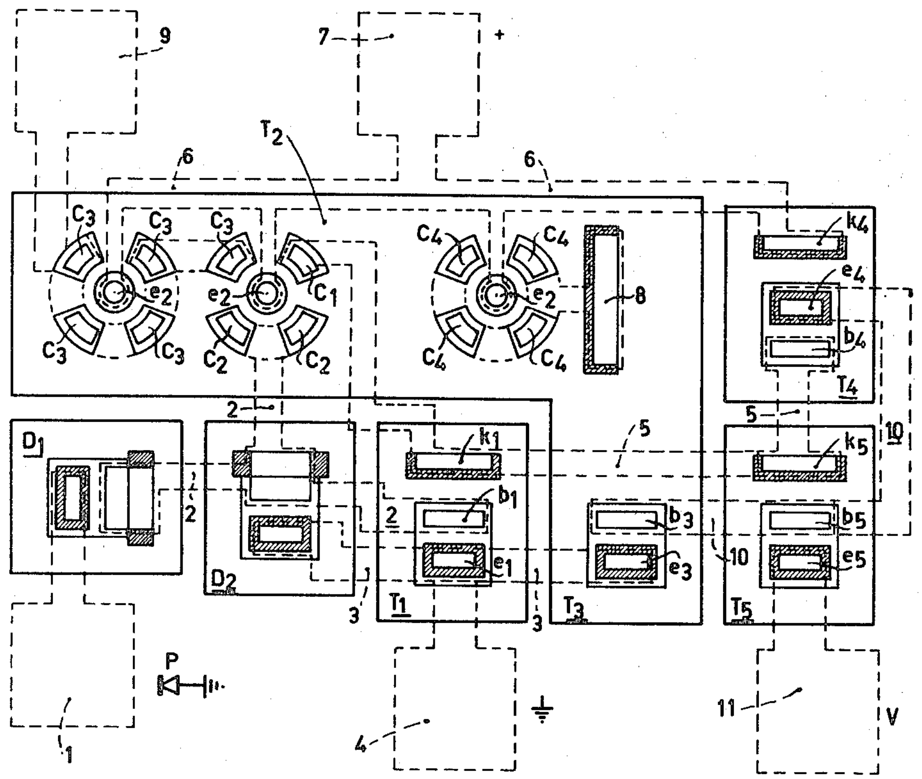
FIG. 3 is the associated semiconductor layout.

FIG. 3 shows the layout of the circuit of FIG. 2. The current offered by the photodiode P is supplied to a bonding pad 1 which is connected to one electrode of the diode D1 the other electrode of which is connected by a lead 2 to the corresponding electrode of the diode $D_2$, to a base contact $b_1$ of the transistor $T_1$ and to collectors $c_2$ of the transistor $T_2$. The other electrode of $D_2$ and emitter contacts $e_1$ and $e_3$ of $T_1$ and $T_3$ respectively are connected by a lead 3 to one another and to a pad 4 which is to be earthed. $T_1$, $T_3$, $T_4$ and $T_5$ have the form of vertical transistors, preferably of the npn type. Hence the p-type base region extends beneath the n-type emitter region having a contact *e*, while the n-type collector region in turn extends beneath this base region. Where these three regions are directly superimposed, transistor action with a comparatively high current gain $\beta_n$ is obtained.

A collector $k_1$ of $T_1$ is connected by a lead 5 to the collectors $c_1$ of $T_2$ and $k_5$ of $T_5$ and to the base $b_4$ of $T_4$. The collector region of $T_3$ forms part of a large n-type island which also comprises the base region of $T_2$. This island includes p-type regions which are arranged side by side and ensure a lateral transistor action. The emitter of $T_2$ comprises three circular p-type regions $e_2$ which by a lead 6 are connected to one another and to a pad 7 to be connected to the (positive) supply terminal. This lead 6 is also connected to the collector $k_4$ of $T_4$. The p-type collector regions *c* are arranged symmetrically around the emitter regions. As the Figure shows, the collecting areas of $c_2$, $c_3$ and $c_4$ are twice, five times and four times respectively that of $c_1$. When we recall to mind the discussion with reference to FIG. 2 we will see that these collectors $c_1$–$c_4$ supply the currents I, 2I, 5I and 4I respectively.

The regions $c_4$ which are interconnected by a lead are connected at 8 to the n-type island which comprises the base region of $T_2$ and the collector region of $T_3$. The collectors $c_3$, which are interconnected by a lead, are further connected to an output pad 9 which supplies the re-generated current (in this case 5I). A lead 10 connects the base $b_3$ of $T_3$ to the base $b_5$ of $T_5$ and to the emitter $e_4$ of $T_4$, and the emitter $e_5$ of $T_5$ is connected to a pad 11 to which the voltage V is to be applied.

The device described may be manufactured by means of photolithographic etching generally used in semiconductor technology in combination with epitaxial growing techniques and doping methods, such as for example diffusion, possibly of doped-out oxide, or ion implantation. Obviously other arrangements of the collectors $c$ of the transistor $T_2$ around its emitter may be used, for example a single strip-shaped emitter region flanked on both sides by symmetrically disposed discrete collector regions.

Figure 4:
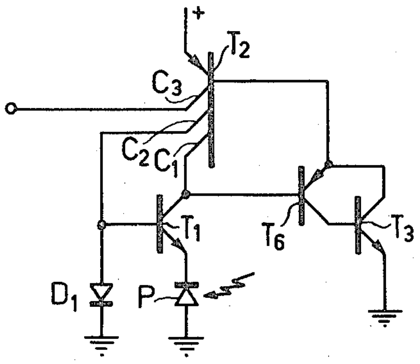
FIG. 4 is a modification of the circuit shown in FIG. 1.

In the modified embodiment shown in FIG. 4 the photodiode P is included in the emitter circuit of the transistor $T_1$ the base of which is connected to earth via the diode $D_1$. The lateral transistor $T_2$ here also through its collectors $c_1$ and $c_2$ supplies equal currents to the collector of $T_1$ and to the diode $D_1$ respectively, assuming the emitting areas of $T_1$ and $D_1$ to be equal. P is again operated at zero voltage, i.e. at its short-circuit current. The collector voltage of $T_1$ is applied to a lateral transistor $T_6$ of the same conductivity type as is $T_2$, after which current amplification in the vertical transistor $T_3$ is effected. The loop amplification now is $\beta_n \cdot \beta_p^2$. In this embodiment also the same refinements as described with reference to FIG. 2 may be used, i.e. providing the diode $D_2$, limiting the current gain of $t_2$ by means of the collector $c_4$, and limiting the current gain $\beta_p$ of $T_6$ in a similar manner.

Naturally a variety of obvious modifications may be conceived. If, for example, the active area of the diode $D_1$ is $n_1$ times the emitter area of $T_1$, in FIG. 1 the collecting area of $c_2$ also is to be made $n_1$ times that of $c_1$. If the effective gain of $T_1$ is to be stabilized at a fixed value greater than unity, the active area of $D_2$ in FIG. 2 may be made $n_2$ times smaller than the emitting area of $T_1$, where $n_2$ is to be smaller than $\beta_n$ and the area of $c_2$ is to be $(n_1 + 1/n_2)$ times that of $c_1$. The connection between $c_2$ and $D_1$ may further include the collector emitter path of a further vertical transistor the base of which is connected to $c_1$, thus perfecting the current mirror action. The output current need not be derived from $c_3$ but may alternatively be derived from the collector of a further vertical transistor $T_7$ (see FIG. 1) the base of which is connected to that of $T_1$, for if the emitter areas of $T_1$ and $T_7$ are equal, these transistors will pass equal currents which are substantially equal to I.

What is claimed is:

1. A circuit for re-generating the short circuit current of a current generating source, comprising:

a first transistor having an emitter, base and collector;

a diode with an effective junction area;

means for electrically connecting a two terminal current source to be regenerated in series with said diode between said base and said emitter of said first transistor;

a second transistor of conductivity type opposite to said first transistor and having an emitter, base and at least first and second collectors, the ratio of the effective collector area of said second collector of said second transistor to the effective collector area of said first collector of said second transistor being approximately equal to the ratio of said effective junction area of said diode to the effective emitter area of said emitter of said first transistor;

an electrical path connecting said first collector of said second transistor to said collector of said first transistor;

an electrical path connecting said second collector of said second transistor to said base of said first transistor;

transistor amplifier means electrically connected between said collector of said first transistor and said base of said second transistor to produce a base current in said second transistor in accordance with the potential of said collector of said first transistor;

means for applying a voltage potential between said emitter of said second transistor and one terminal of the current source to be regenerated; and output means electrically connected to a collector of said second transistor for deriving the re-generated current.

2. A circuit as defined in claim 1 in integrated circuit form in which said first transistor is a vertical transistor and said second transistor is a lateral transistor.

3. A circuit as defined in claim 2 wherein said first transistor is of npn type and said second transistor is of pnp type.

4. A circuit as defined in claim 2 wherein said collector to which said output means is electrically connected is a third collector of said second transistor, said output means being means for making electrical connection with said third collector.

5. A circuit as defined in claim 2 wherein said output means comprises an additional transistor having an emitter, base and collector, said base of said additional transistor being electrically connected to said base of said first transistor.

6. A circuit as defined in claim 2 wherein said transistor amplifier means includes a third transistor of conductivity type equal to said first transistor and having an emitter, base and collector, said collector of said third transistor being electrically connected to said base of said second transistor, said emitter of said third transistor being, electrically connected to said one terminal of the current source to be regenerated and said base of said third transistor being electrically responsive to the potential of said collector of said first transistor.

7. A circuit as defined in claim 6 wherein the current gain of said first, second, and third transistors is stabilized.

8. A circuit for re-generating the short circuit current of a current generating source, comprising:

a first transistor having an emitter, base and collector;

a first diode with an effective junction area;

a second diode with an effective junction area;

means for electrically connecting a two terminal current source to be regenerated in series with said first diode between said base and said emitter of said first transistor, said second diode being electrically connected between said base and said emitter of said first transistor;

a second transistor of conductivity type opposite to said first transistor and having an emitter, base and at least first and second collectors, the ratio of the effective collector area of said second collector of said second transistor to the effective collector area of said first collector of said second transistor being approximately equal to the ratio of the sum of said effective junction areas of said first and second diodes to the effective emitter area of said emitter of said first transistor;

an electrical path connecting said first collector of said second transistor to said collector of said first transistor;

an electrical path connecting said second collector of said second transistor to said base of said first transistor;

transistor amplifier means electrically connected between said collector of said first transistor and said base of said second transistor to produce a base current in said second transistor in accordance with the potential of said collector of said first transistor;

means for applying a voltage potential between said emitter of said second transistor and said emitter of said first transistor; and output means electrically connected to a collector of said second transistor for deriving the re-generated current.

* * * * *